(12) United States Patent
Mongeau

(10) Patent No.: US 10,609,432 B1
(45) Date of Patent: *Mar. 31, 2020

(54) SERVER AND METHOD FOR SYNCHRONIZING DISPLAY OF A DIGITAL CONTENT ON A PLURALITY OF COMPUTING DEVICES

(71) Applicant: BROADSIGN SERV LLC, St. Louis, MO (US)

(72) Inventor: Bryan Mongeau, Beaconsfield (CA)

(73) Assignee: Broadsign Serv LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/354,339

(22) Filed: Mar. 15, 2019

Related U.S. Application Data

(63) Continuation-in-part of application No. 16/214,498, filed on Dec. 10, 2018.

(51) Int. Cl.
*H04N 21/242* (2011.01)
*H04N 21/43* (2011.01)
*H04N 21/41* (2011.01)

(52) U.S. Cl.
CPC ....... *H04N 21/242* (2013.01); *H04N 21/4122* (2013.01); *H04N 21/4307* (2013.01)

(58) Field of Classification Search
CPC ........................................................ G09G 5/12
See application file for complete search history.

(56) References Cited

U.S. PATENT DOCUMENTS

| | | | | |
|---|---|---|---|---|
| 6,046,709 A | * | 4/2000 | Shelton | G06F 3/1446 345/1.1 |
| 6,157,395 A | * | 12/2000 | Alcorn | G06F 3/14 345/504 |
| 2010/0103781 A1 | * | 4/2010 | Rai | G06F 1/12 368/55 |
| 2014/0340330 A1 | | 11/2014 | Trachtenberg et al. | |
| 2015/0142883 A1 | * | 5/2015 | Ohbi | H04N 5/765 709/203 |
| 2017/0244993 A1 | | 8/2017 | Rothschild | |
| 2018/0109826 A1 | | 4/2018 | McCoy et al. | |

* cited by examiner

*Primary Examiner* — Paulos M Natnael
(74) *Attorney, Agent, or Firm* — Breiner & Breiner, L.L.C.

(57) ABSTRACT

Server and method for synchronizing display of a digital content on a plurality of computing devices. The server transmits a synchronization request, including a digital content identifier for identifying the digital content, to the devices. The server determines a number of negative responses received from the devices in response to the synchronization request. Each negative response is indicative of one among the plurality of devices not being capable of displaying the digital content. The server transmits a new synchronization request to the computing devices if the number of received negative responses reaches a threshold. The server transmits a display command to the devices for displaying the digital content on their respective displays if the number of received negative responses does not reach the threshold. For example, the method applies to a digital signage server synchronizing display of a digital signage content on a plurality of digital signage players.

25 Claims, 5 Drawing Sheets

SERVER AND METHOD FOR SYNCHRONIZING DISPLAY OF A DIGITAL CONTENT ON A PLURALITY OF COMPUTING DEVICES

RELATED APPLICATION

The present application is a continuation-in-part of and claims benefit of Non-provisional application Ser. No. 16/214,498 filed Dec. 10, 2018, entitled "Master Computing Device And Method For Synchronizing Display Of A Digital Content", and which is incorporated herein in its entirety by reference.

TECHNICAL FIELD

The present disclosure relates to the field of digital signage. More specifically, the present disclosure presents a server and a method for synchronizing display of a digital content on a plurality of computing devices.

BACKGROUND

Signage refers to graphic designs, such as symbols, emblems, words, etc. In advertising, signage refers to the design or use of signs and symbols to communicate a message to a specific group, usually for the purpose of marketing. Digital signage is a sub segment of signage and comprises the use of digital signage display units also referred to as digital signage players. Digital signage players include liquid-crystal displays (LCDs), light-emitting diode (LED) displays, projector screens, etc. A digital signage player displays a succession of digital signage contents, such as still images, videos, etc. Digital signage is a field in great expansion especially for advertising in a public venue (e.g. an airport, a shopping mall, etc.), because of the potential to advertise dynamically, such as is done with an advertising video.

In certain circumstances, it is necessary to have the same digital signage content displayed by a plurality of digital signage players in a synchronous manner. For example, in a waiting hall of an airport, all the digital signage players present in the hall display the same advertising campaign at the same time. Furthermore, by contract with the owner of the advertising campaign, the owner of the digital signage infrastructure has the obligation to have the advertising campaign displayed on all of the digital signage players present in the hall and at the same time. It is not acceptable by the terms of the contract that a single digital signage player fails to display the advertising campaign.

In this context, is it not sufficient to a have a digital signage server send a command to all the digital signage players present in the hall for requesting the display of the advertising campaign simultaneously at a given instant. If any one of the digital signage players is not capable of displaying the advertising campaign at the given instant, the terms of the contract with the owner of the advertising campaign are broken. A more sophisticated procedure is necessary for performing the synchronized display of the advertising campaign on all the digital signage players. The procedure needs to provide the capability to address the situation where operating conditions of one of the players do not allow instant display of the advertising campaign.

Therefore, there is a need for a digital signage server and a method for synchronizing display of a digital signage content on a plurality of digital signage players.

SUMMARY

According to a first aspect, the present disclosure relates to a method for synchronizing display of a digital content on a plurality of computing devices. The method comprises determining, by a processing unit of a server, that the digital content shall be displayed synchronously on respective displays of the plurality of computing devices. The method comprises transmitting, by the processing unit of the server, a synchronization request to the plurality of computing devices. The synchronization request comprises a digital content identifier for identifying the digital content. The method comprises determining, by the processing unit of the server, a number of negative responses received from the plurality of computing devices in response to the synchronization request. Each negative response is indicative of one among the plurality of computing devices not being capable of displaying the digital content. The method comprises transmitting, by the processing unit of the server, a new synchronization request to the plurality of computing devices if the number of received negative responses reaches a threshold. The new synchronization request comprises the digital content identifier.

According to a second aspect, the present disclosure relates to a non-transitory computer program product comprising instructions executable by a processing unit of a server. The execution of the instructions by the processing unit of the server provides for synchronizing display of a digital content on a plurality of computing devices, by implementing the aforementioned method.

According to a third aspect, the present disclosure relates to a server for synchronizing display of a digital content on a plurality of computing devices. The server comprises a communication interface for exchanging data with the plurality of computing devices, and a processing unit. The processing unit determines that the digital content shall be displayed synchronously on respective displays of the plurality of computing devices. The processing unit transmits a synchronization request to the plurality of computing devices via the communication interface. The synchronization request comprises a digital content identifier for identifying the digital content. The processing unit determines a number of negative responses received from the plurality of computing devices in response to the synchronization request via the communication interface. Each negative response is indicative of one among the plurality of computing devices not being capable of displaying the digital content. The processing unit transmits a new synchronization request to the plurality of computing devices (via the communication interface) if the number of received negative responses reaches a threshold. The new synchronization request comprises the digital content identifier.

In a particular aspect, the server is a digital signage server, the plurality of computing devices is a plurality of digital signage players, and the digital content is a digital signage content.

In another particular aspect, the processing unit of the server transmits a display command to the plurality of computing devices (for displaying the digital content on the respective displays of the plurality of computing devices) if the number of received negative responses does not reach the threshold.

In still another particular aspect, the processing unit of the server transmits a display command to the plurality of computing devices (for displaying the digital content on the respective displays of the plurality of computing devices) if a timer reaches a timeout value.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to the synchronization of the display of a digital signage content on a synchronized group of digital signage players. A digital signage server is in charge of initiating and controlling the synchronization process.

Figure 1:
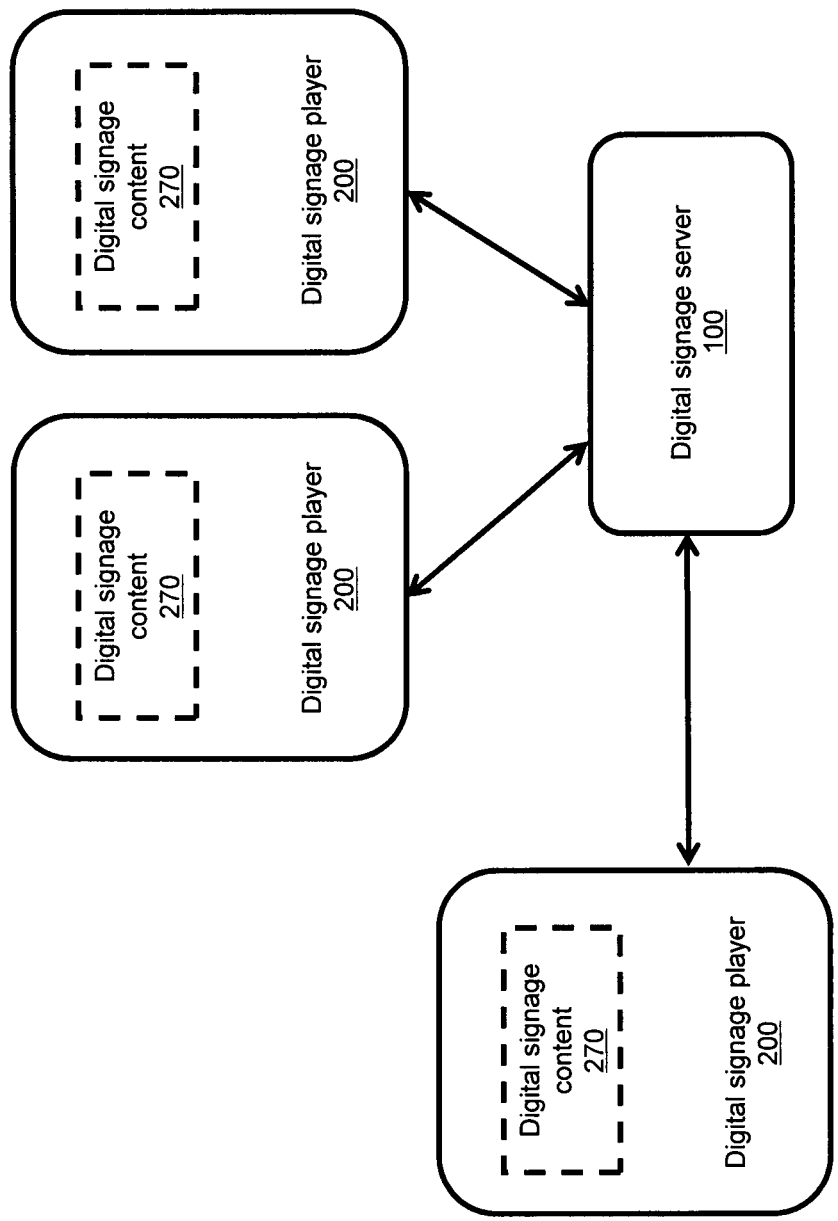
FIG. 1 represents a plurality of digital signage players under the control of a digital signage server.
Figure 2:
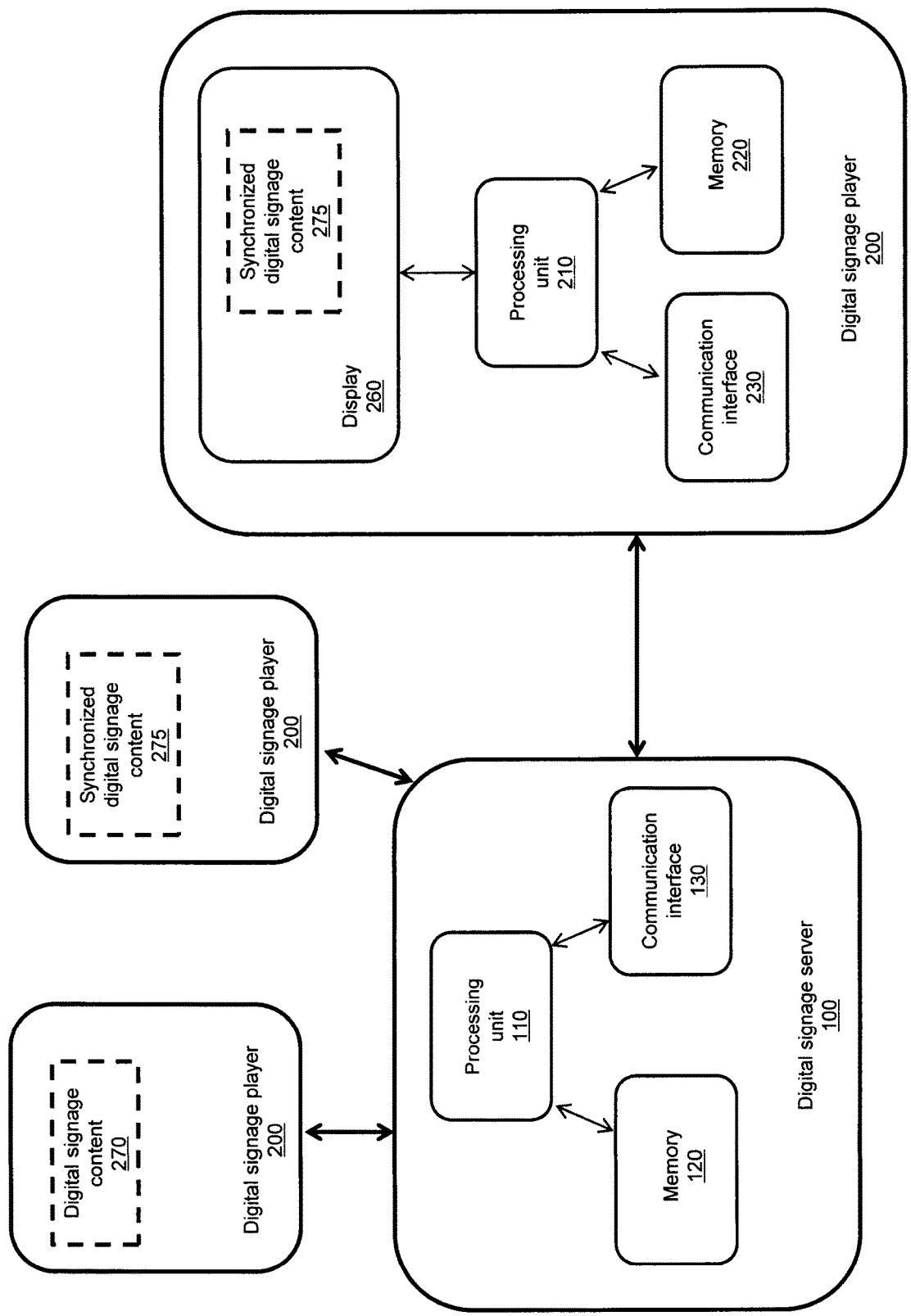
FIG. 2 represents a plurality of synchronized digital signage players displaying a synchronized digital signage content under the control of a digital signage server.

Referring now concurrently to FIGS. 1 and 2, a digital signage server 100 and a plurality of digital signage players 200 are represented.

In a traditional digital signage infrastructure illustrated in FIG. 1, the digital signage server 100 controls the digital signage content 270 displayed on the plurality of digital signage players 200. More specifically, the digital signage server 100 determines which digital signage content 270 is displayed on each digital signage player 200, when a digital signage content 270 shall be displayed, how often a digital signage content 270 shall be repeated, at which position of a screen a digital signage content 270 shall be displayed, etc. For this purpose, the digital signage server 100 generates a signage loop to rotate digital signage contents 270 on each digital signage player 200. Each digital signage player 200 receives from the digital signage server 100 its own signage loop, and the digital signage contents 270 referred to in the signage loop. The digital signage player 200 then displays the retrieved digital signage contents 270 in accordance with the signage loop.

The digital signage player 200 is a computing device comprising the following components, illustrated in FIG. 2.

The digital signage player 200 comprises a processing unit 210. The processing unit 210 comprises one or more processors (not represented in FIG. 2) capable of executing instructions of computer program(s) for performing the functionalities of the digital signage player 200 (receiving data, processing the received data, generating data, transmitting the generated data, displaying data on a display 260, etc.). Each processor may further have one or several cores.

The digital signage player 200 comprises memory 220. The memory 220 stores instructions of the computer program(s) executed by the processing unit 210, data generated by the execution of the computer program(s), data received from a communication interface 230, etc. Only a single memory 220 is represented in FIG. 2, but the digital signage player 200 may comprise several types of memories, including volatile memory (such as a volatile Random Access Memory (RAM), etc.) and non-volatile memory (such as a hard drive, electrically-erasable programmable read-only memory (EEPROM), etc.).

The digital signage player 200 comprises the communication interface 230. The communication interface 230 allows the digital signage player 200 to exchange data with the digital signage server 100, and optionally with other computing devices (e.g. neighbor digital signage players 200). For simplification purposes, we refer to a single communication interface 230 capable of supporting one or more of the following communication technologies: fixed broadband, Ethernet, cellular, Wi-Fi, mesh, Bluetooth, etc. For example, the digital signage player 200 communicates with the digital signage server 100 via a cellular network or a fixed broadband network, and optionally communicates with neighbor digital signage players 200 via a Wi-Fi network. In this case, the communication interface 230 comprises a cellular (or fixed broadband) communication functionality and a Wi-Fi communication functionality. The communication interface 230 usually comprises a combination of hardware and software executed by the hardware, for implementing the communication functionalities of the communication interface 230.

The digital signage player 200 comprises a display 260. A single display 260 is represented in FIG. 2. However, the digital signage player 200 may comprise several displays 260. Digital signage content is displayed on the one or more display 260. The display 260 consists of, without limitations, a liquid-crystal display (LCD), a light-emitting diode (LED) display, an organic light-emitting diode (OLED) display, a projector screen, a combination thereof, etc. The display 260 may have a large screen, to be visible by a large crowd. The digital signage player 200 is usually located in a public venue (e.g. an airport, a shopping mall, etc.), so that a large number of persons located close to the digital signage player 200 can see a digital signage content 270 or 275 displayed on its display(s) 260.

The digital signage player 200 may include additional optional components (not represented in FIG. 2), such as a user interface (e.g. a keyboard or a touchscreen), one or more sensor (e.g. a camera), etc.

For simplification purposes, the digital signage players 200 will be referred to as players in the rest of the description.

The digital signage server 100 is also a computing device comprising the following components, illustrated in FIG. 2.

The digital signage server 100 comprises a processing unit 110. The processing unit 110 comprises one or more processors (not represented in FIG. 2) capable of executing instructions of computer program(s) for performing the functionalities of the digital signage server 100 (receiving data, processing the received data, generating data, transmitting the generated data, etc.). Each processor may further have one or several cores.

The digital signage server 100 comprises memory 120. The memory 120 stores instructions of the computer program(s) executed by the processing unit 110, data generated by the execution of the computer program(s), data received from a communication interface 130, etc. Only a single memory 120 is represented in FIG. 2, but the digital signage server 100 may comprise several types of memories, including volatile memory (such as a volatile Random Access Memory (RAM), etc.) and non-volatile memory (such as a hard drive, electrically-erasable programmable read-only memory (EEPROM), etc.).

The digital signage server 100 comprises the communication interface 130. The communication interface 130 allows the digital signage server 100 to exchange data with the players 200, and optionally with other computing device(s). For simplification purposes, we refer to a single communication interface 130 capable of supporting one or more of the following communication technologies: fixed broadband, Ethernet, cellular, Wi-Fi, mesh, Bluetooth, etc. For example, the digital signage server 100 communicates with the players 200 via a cellular network or a fixed broadband network, and optionally communicates with other computing device(s) via a Wi-Fi network. In this case, the communication interface 130 comprises a cellular (or fixed broadband) communication functionality and a Wi-Fi communication functionality. The communication interface 130 usually comprises a combination of hardware and software executed by the hardware, for implementing the communication functionalities of the communication interface 130.

The digital signage server 100 may include additional optional components (not represented in FIG. 2), such as a display, a user interface (e.g. a keyboard or a touchscreen), etc.

Referring now more particularly to FIG. 2, a plurality of players 200 are members of a synchronized group of players. The synchronized group may include any number of players 200 greater or equal to two.

Within a given geographical area (e.g. an airport, a shopping mall, one or more streets, etc.) where a plurality of players are located, one or more synchronized group of players may be set up. The players of a synchronized group have characteristics in common. Based on these characteristics, the same digital signage content is displayed synchronously on the displays of the players of the synchronized group. In the rest of the description, the players belonging to a synchronized group will be referred to as synchronized players. FIG. 2 illustrates the synchronized display of the same digital signage content 275 by two synchronized players 200, while a third player 200 independently displays the digital signage content 270. FIG. 2 is for illustration purposes only, and other configurations of synchronized and unsynchronized players 200 may be deployed.

The synchronized display of the same digital signage content 275 for the synchronized group of players 200 is controlled by the digital signage server 100. The players of a synchronized group may operate alternatively (or even simultaneously) in a synchronized manner (for synchronized digital signage content 275) and in an unsynchronized manned (for unsynchronized digital signage content 270). In the rest of the description, the reference number 275 is used for a digital signage content which is displayed in a synchronized manner, while the reference number 270 is used for other digital signage contents.

Although a single digital signage content 275 is represented in FIG. 2, several independent digital signage contents 275 may be displayed at the same time in a synchronized manner by the plurality of synchronized players 200.

In order to perform a synchronized display of the same digital signage content 275 by the plurality of synchronized players 200, the digital signage content 275 must be available to the plurality of synchronized players 200. For instance, the digital signage content 275 is downloaded from a central repository and stored at the plurality of synchronized players 200. The digital signage content 275 is downloaded and cached locally rather than being streamed from the central repository to avoid communication problems which may occur between the central repository and some of the synchronized players 200, preventing real time streaming of the digital signage content 275.

In addition to having the digital signage content 275 stored on the synchronized players 200 before displaying it, the synchronized players 200 need to be in operating conditions allowing display of the digital signage content 275 on their respective displays 260. For example, if one of the synchronized players is out of order, the display of the digital signage content 275 cannot be performed. An exhaustive list of all the conditions under which the display of the digital signage content 275 cannot be performed is out of the scope of the present disclosure.

Figure 3:
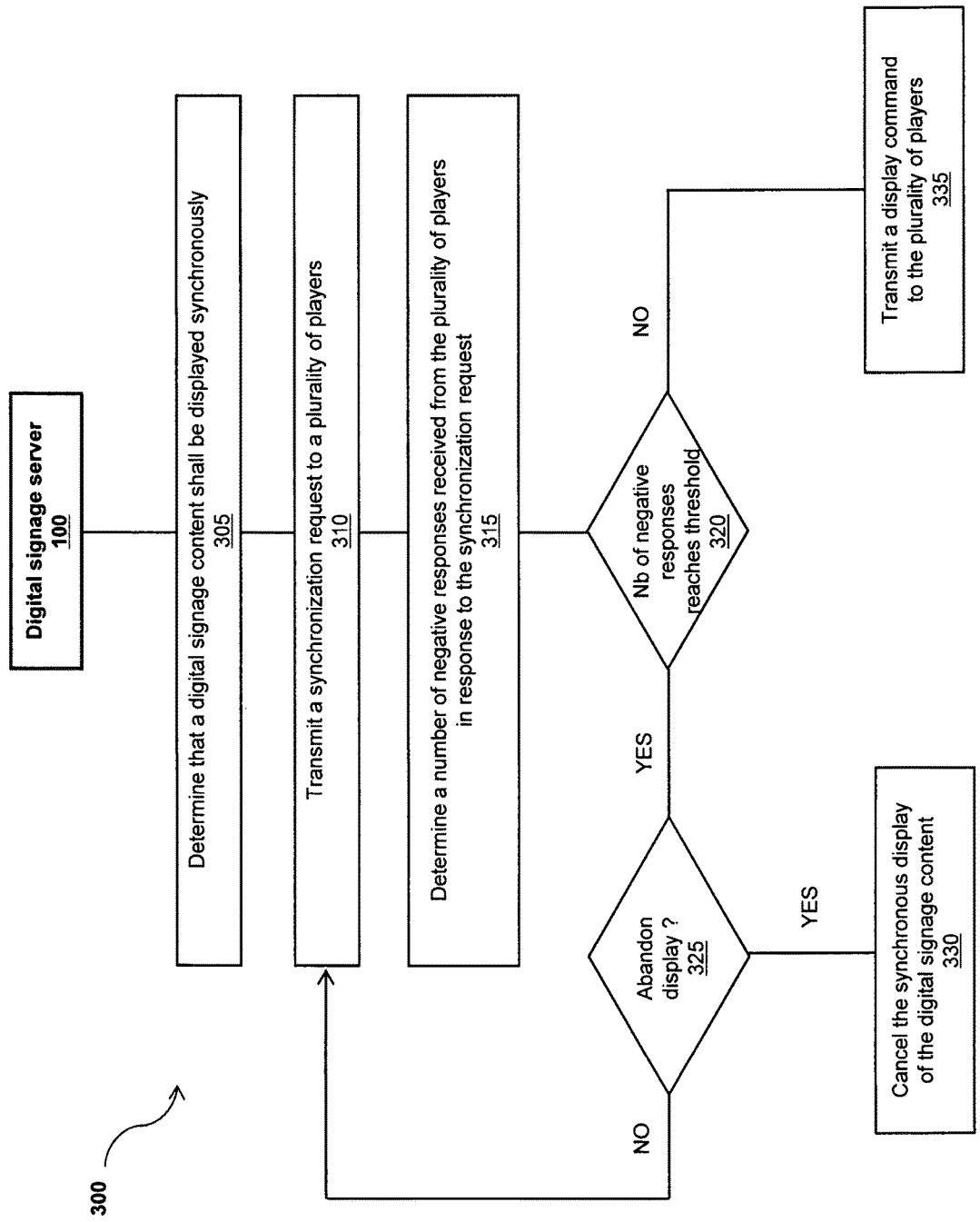
FIG. 3 illustrates a method executed by the digital signage server of FIG. 2 for synchronizing the display of the synchronized digital signage content.

Referring now concurrently to FIGS. 2 and 3, a method 300 for synchronizing display of the digital signage content 275 on the plurality of synchronized players 200 is represented in FIG. 3. The method 300 is implemented by the digital signage server 100. Although two synchronized players 200 are represented in FIG. 2, the method 300 is applicable to any number of synchronized player 200 greater or equal to two.

A specific computer program has instructions for implementing the steps of the method 300. The instructions are comprised in a non-transitory computer program product (e.g. the memory 120). The instructions provide for synchronizing display of the digital signage content 275 on the plurality of synchronized players 200, when executed by the processing unit 110 of the digital signage server 100. The instructions are deliverable via an electronically-readable media, such as a storage media (e.g. a USB key), or via communication links (e.g. a Wi-Fi or cellular network) through the communication interface 130 of the digital signage server 100.

The method 300 comprises the step 305 of determining that the digital signage content 275 shall be displayed synchronously on the respective displays 260 of the plurality of synchronized players 200. Step 305 is executed by the processing unit 110 of the digital signage server 100.

A plurality of digital signage content identifiers is stored in the memory 120 of the digital signage server 100. Each digital signage content identifier identifies a corresponding digital signage content. At a given instant, the processing unit 110 determines that a given digital signage content 275 among the plurality of digital signage contents shall be displayed synchronously on the respective displays 260 of the plurality of synchronized players 200. The given digital signage content 275 is identified by its identifier. The determination is performed based on one or more criterion. Examples of criteria include a display loop (defining a sequence of digital signage contents to be displayed over time), current audience characteristics of the synchronized players 200 determined statistically and/or in real time, etc.

The method 300 comprises the step 310 of transmitting a synchronization request to the plurality of synchronized players 200. Step 310 is executed by the processing unit 110 of the digital signage server 100. The synchronization request is transmitted via the communication interface 130. The synchronization request comprises the digital signage content identifier of the digital signage content 275 to be displayed. As mentioned previously, the goal of the synchronization request is to determine if the plurality of synchronized players 200 is capable of displaying the digital signage content 275.

In addition to the digital signage content identifier, the synchronization request may include additional information for controlling operations of the plurality of synchronized players 200. For example, the additional information includes instruction to download content (e.g. download the digital signage content 275), conditions to clear/reset the display of content (e.g. conditions applicable to the digital signage content 275), instructions to ready content for display (e.g. ready the digital signage content 275), etc.

The synchronization request is broadcasted. The advantage of broadcasting is that the digital signage server 100 does not need to know how to reach the plurality of synchronized players 200. For instance, if the Internet Protocol (IP) is used, the digital signage server 100 does not need to know the IP address or Domain Name Server (DNS) name of the plurality of synchronized players 200. The broadcast synchronization request is received by all the devices within reach of the broadcast domain. For example, the broadcast synchronization request is transmitted using the User Datagram Protocol (UDP).

As mentioned previously, the plurality of synchronized players 200 belongs to a synchronized group. The synchronized group has a group identifier, to identify the synchronized group and differentiate it from other synchronized groups. The group identifier is stored in the memory 120 of the digital signage server 100 and in the respective memories 220 of the plurality of synchronized players 200.

The group identifier is included (by the processing unit 110) in the synchronization request. Thus, the plurality of synchronized players 200 receives the synchronization request, and determines that it should process the synchronization request because of the presence of the group identifier in the synchronization request (which matches the group identifier stored in its memory 220). Similarly, another player 200 (e.g. the one displaying the digital signage content 270 in FIG. 2) not belonging to the synchronized group determines that it should not process the synchronization request because of the presence of the group identifier in the synchronization request (which does not match the group identifier (if any) stored in its memory 220).

Alternatively, the multicast technology is used instead of the broadcast technology. For example, each synchronized group is associated to a corresponding multicast group. The synchronization request is transmitted to the multicast group (corresponding to the synchronized group) by the digital signage server 100. The plurality of synchronized players 200 joins the multicast group, to receive the multicast synchronization request. For example, the multicast synchronization request is transmitted using the UDP protocol.

Alternatively, the digital signage server 100 stores in the memory 120 a communication identifier (e.g. IP address or DNS name) for each one among the plurality of synchronized players 200. The digital signage server 100 transmits a unicast synchronization request to each one of the synchronized players 200, using the respective communication identifier(s). For example, the unicast synchronization request is transmitted using the Transmission Control Protocol (TCP).

Other alternatives include a time-based synchronization, where the synchronized players 200 need to know the IP address of the digital signage server 100; a cloud-based synchronization where the coordination between the digital signage server and players is based on a cloud service; etc.

The processing of the synchronization request by the plurality of synchronized players 200 will be detailed later in the description.

The method 300 comprises the step 315 of determining a number of negative responses received from the plurality of synchronized players 200 in response to the synchronization request sent at step 310. Each negative response is indicative of one among the plurality of synchronized players 200 not being capable of displaying the digital signage content 275. Step 315 is executed by the processing unit 110 of the digital signage server 100.

The negative response may include the digital signage content identifier of the digital signage content 275. This allows the digital signage server 100 to distinguish between concurrently received negative responses corresponding to different digital signage contents 275 to be displayed on the plurality of synchronized players 200.

A synchronized player 200 sends a negative response if it is not capable of displaying the digital signage content 275, and does not send any response if it is capable of displaying it. For example, if the number of synchronized players 200 is N, 0 to N negative responses may be received by the digital signage server 100. The digital signage server 100 waits for a given amount of time after sending the synchronization request at step 310, to leave enough time to each one among the plurality of synchronized players 200 to process the synchronization request and send the negative response if applicable. At the end of the given amount of time, the total number of negative responses received by the digital signage server 100 is determined. The given amount of time is stored in the memory 120 and can be configured.

Alternatively, a synchronized player 200 sends a negative response if it is not capable of displaying the digital signage content 275, and sends a positive response if it is capable of displaying it. For example, the response comprises a flag indicating the capability or incapability of displaying the digital signage content 275. In this case, a response (positive or negative) is expected from each synchronized player 200. Once the expected response has been received from all the synchronized players 200, the total number of negative responses received by the digital signage server 100 is determined.

The method 300 comprises the step 320 of determining if the number of negative responses determined at step 315 reaches a threshold. Step 320 is executed by the processing unit 110 of the digital signage server 100. The threshold is stored in the memory 120 and can be reconfigured.

In a first implementation, the threshold evaluated at step 320 is set to one. In this case, if at least one synchronized player 200 sends a negative response, then the threshold is reached. In another implementation, the threshold evaluated at step 320 is a percentage of the total number of synchronized players 200 (belonging to the synchronized group). For example, the total number of players 200 is 5 and the threshold is set to 25%. In this case, if at least two synchronized players 200 send a negative response, then the threshold is reached.

If the threshold is reached, then step 325 is executed. Otherwise, step 335 is executed.

The method 300 comprises the step 325 of determining if the display of the digital signage content 275 shall be abandoned or not. Step 325 is executed by the processing unit 110 of the digital signage server 100.

In a first implementation, step 325 consists in determining if a maximum number of synchronization requests is reached (maximum number of iterations of step 310). The maximum number of synchronization requests is stored in the memory 120 and can be reconfigured.

Each time step 310 is performed (for a given digital signage content 275), the number of transmitted synchronization requests is incremented by one. The number of transmitted synchronization requests is initialized at 0 at step 305. The number of transmitted synchronization requests is compared to the maximum number of synchronization requests at step 325.

If the maximum number of synchronization requests is not reached, the method 300 proceeds to step 310, and a new synchronization request is sent to the plurality of synchronized players 200. Thus, if the maximum number of synchronization requests is N, then a maximum of N iterations of steps 310, 315, 320 and 325 is performed before proceeding to step 330.

If the maximum number of synchronization requests is reached, step 330 is executed.

Step 330 of the method 300 consists in cancelling the synchronized display of the digital signage content 275 on the respective displays 260 of the plurality of synchronized players 200. Step 330 is executed by the processing unit 110 of the digital signage server 100.

With respect to the digital signage server 100, step 330 simply consists in terminating the execution of the method 300. The digital signage server 100 may further set a timer for trying to display the digital signage content 275 later (by re-executing the method 300 later). The digital signage server 100 may also select a new digital signage content 375 according to step 305, and proceed with applying the method 300 to the new digital signage content 275.

With respect to the plurality of synchronized players 200, step 330 simply consists in not sending a display command which will be described at step 335 of the method 300.

In a simplified implementation of the method 300, the maximum number of synchronization requests (the maximum number of iterations of step 310) is set to one, and step 325 is omitted. Thus, if the threshold is reached at step 320, step 330 is executed directly.

In another implementation of step 325 of the method 300, the maximum number of synchronization requests (the maximum number of iterations of step 310) is not determined by a pre-defined maximum count, but by a maximum duration. Thus, at step 325, if the maximum duration is not reached, the digital signage server 100 proceeds with a new iteration of step 310. However, if the maximum duration is reached, the digital signage server 100 proceeds with the execution of step 330. The duration is initialized at step 305.

In still another implementation of step 325 of the method 300, if the maximum duration is reached, the digital signage server 100 proceeds with the execution of step 335 (transmit a display command) even if one or more synchronized player 200 is not capable of displaying the digital signage content 275. For example, a timer is started at step 305 with a timeout value set to the maximum duration; and step 335 is executed if the timer reaches the timeout value. Furthermore, the mechanism relying on the timer with the timeout value and the mechanism relying on the threshold (step 320)/maximum number of synchronization requests (step 325) can be implemented simultaneously.

Optionally, before sending the new synchronization request (repeating step 310 with a new request), the digital signage server 100 waits for a pre-defined amount of time after the determination at step 325 has been performed. This pre-defined amount of time allows one or more synchronized player 200 which was not capable of displaying the digital signage content 275, to correct the situation and become capable of displaying the digital signage content 275. The pre-defined amount of time is stored in the memory 120 and can be reconfigured.

The pre-defined amount of time may be increased at each iteration. For instance, the pre-defined amount of time is set to 10 seconds for the first new synchronization request sent (second iteration of step 310), the pre-defined amount of time is set to 30 seconds for the second new synchronization request sent (third iteration of step 310), etc.

The method 300 comprises the step 335 of transmitting a display command to the plurality of synchronized players 200, for displaying the digital signage content 275 on the respective displays 260 of the plurality of synchronized players 200. Step 335 is executed by the processing unit 110 of the digital signage server 100. The display command is transmitted via the communication interface 130. The display command comprises the digital signage content identifier of the digital signage content 275 to be displayed.

As mentioned previously, the display command may be broadcasted, multicasted or unicasted.

The processing of the display command by the plurality of synchronized players 200 will be detailed later in the description.

In order to ensure the synchronized display, the display command may include a time reference for displaying the digital signage content 275. For example, an absolute time reference is used. The digital signage content 275 is displayed on the plurality of synchronized players 200 when the absolute time reference is reached. In another example, a relative time reference is used. The digital signage content 275 is displayed on the plurality of synchronized players 200 after the relative time reference is elapsed following the reception of the display command.

Alternatively, the digital signage content 275 is displayed by the plurality of synchronized players 200 directly after receiving the display command. The delay for transmitting the display command (over a communication network) is considered negligible and the simultaneous display on the plurality of synchronized players 200 is considered to be substantially synchronized.

The digital signage server 100 may manage a plurality of synchronized groups, applying the method 300 for each one of the synchronized groups. Furthermore, a synchronized player 200 may belong to more than one synchronized group, applying the method 400 represented in FIG. 4 for each one of the synchronized groups.

Figure 4:
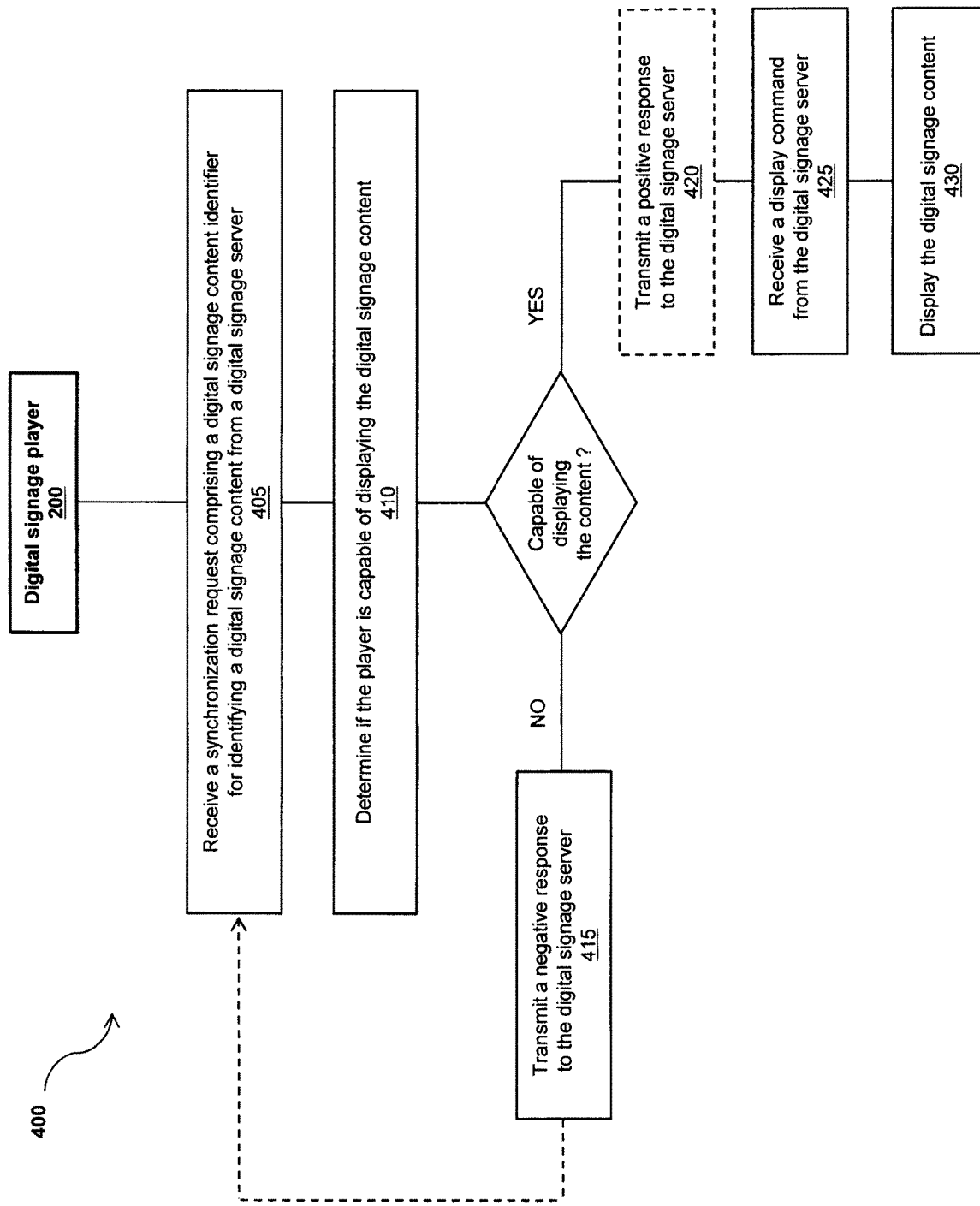
FIG. 4 illustrates a complementary method executed by one of the plurality of synchronized digital signage players of FIG. 2 for synchronizing the display of the synchronized digital signage content.

Referring now concurrently to FIGS. 2 and 4, a method 400 for synchronizing display of the digital signage content 275 on one of the plurality of synchronized players 200 is represented in FIG. 4. The method 400 is implemented by each one of the plurality of synchronized players 200 represented in FIG. 2 which belongs to the synchronized group selected for displaying the digital signage content 275.

A specific computer program has instructions for implementing the steps of the method 400. The instructions are comprised in a non-transitory computer program product (e.g. the memory 220 of the synchronized player 200). The instructions provide for synchronizing display of the digital signage content 275 on the synchronized player 200, when executed by the processing unit 210 of the synchronized player 200. The instructions are deliverable via an electronically-readable media, such as a storage media (e.g. a USB key), or via communication links (e.g. a Wi-Fi or cellular network) through the communication interface 230 of the synchronized player 200.

The method 400 comprises the step 405 of receiving a synchronization request from the digital signage server 100. Step 405 is executed by the processing unit 210 of the synchronized player 200. The synchronization request is received via the communication interface 230. The synchronization request comprises the digital signage content identifier of the digital signage content 275 to be displayed. Step 405 corresponds to step 310 of the method 300 represented in FIG. 3.

As mentioned previously, in addition to the digital signage content identifier, the synchronization request may include additional information for controlling operations of the synchronized player 200. For example, the additional information includes instruction to download content (e.g. download the digital signage content 275), conditions to clear/reset the display of content (e.g. conditions applicable to the digital signage content 275), instructions to ready content for display (e.g. ready the digital signage content 275), etc. The additional information is stored in the memory 220. If the additional information comprises instructions, the instructions are executed immediately or later by the processing unit 210, based on the purpose of these instructions. If the additional information comprises conditions to perform a task, the conditions are taken into consideration immediately or later by the processing unit 210, based on the purpose of these conditions.

As mentioned previously, the synchronization request may be broadcasted, multicasted or unicasted.

If the synchronization request is broadcasted, the aforementioned group identifier is included (by the digital signage server 100) in the synchronization request. As mentioned previously, the synchronized player 200 belongs to a synchronized group identified by the group identifier. The group identifier is stored in the memory 220 of the synchronized player 200. Upon reception of the synchronization request at step 405, the processing unit 210 of the synchronized player 200 determines that it should process the synchronization request because of the presence of the group identifier (which matches the group identifier stored in its memory 220). However, upon reception of another synchronization request at step 405, the processing unit 210 of the synchronized player 200 determines that it should not process the other synchronization request because of the presence of another group identifier (which does not match the group identifier stored in its memory 220).

If the synchronization request is multicasted, the synchronization request is transmitted to a multicast group (corresponding to the synchronized group) by the digital signage server 100. The synchronized player 200 joins the multicast group before executing step 405, to be able to receive the multicast synchronization request at step 405.

The method 400 comprises the step 410 of determining if the synchronized player 200 is capable of displaying the digital signage content 275 (corresponding to the digital signage content identifier included in the synchronization request) on the display 260 of the synchronized player 200. Step 410 is executed by the processing unit 210 of the synchronized player 200.

Various circumstances may lead to the determination that the synchronized player 200 is not capable of displaying the digital signage content 275. Following are a few examples, which are not intended to be limitative.

In a first example, the digital signage content 275 is not stored in the memory 220 of the synchronized player 200. As mentioned previously, in the context of digital signage, displaying digital signage content stored in the memory 220 is preferred to streaming the digital signage content from a remote server without storage in the memory 220. The digital signage content 275 is not stored in the memory 220 because the digital signage content 275 has not been downloaded yet from a remote server. Alternatively, the digital signage content 275 was previously downloaded from a remote server and stored in the memory 220. However, the digital signage content 275 has been erased from the memory 220, has been corrupted, etc. In any of these cases, the processing unit 210 of the synchronized player 200 initiates a download of the digital signage content 275 following step 415 and stores the downloaded digital signage content 275 in the memory 220.

In a second example, the display 260 of the synchronized player 200 is not operational and does not allow display of the digital signage content 275. In this case, the processing unit 210 of the synchronized player 200 initiates a procedure to reset the display 260 to an operational state. Other components (than the display 260) of the synchronized player 200 may not be operational and prevent the synchronized player 200 from displaying the digital signage content 275.

In a third example, the synchronized player 200 already has scheduled digital signage content to display on the display 260 and cannot cancel/interrupt the display of the scheduled digital signage content for displaying the digital signage content 275.

The method 400 comprises the step 415 of transmitting a negative response (indicative of the synchronized player 200 not being capable of displaying the digital signage content 275) to the digital signage server 100. Step 415 is executed by the processing unit 210 of the synchronized player 200. The negative response is transmitted via the communication interface 230. Step 415 corresponds to step 315 of the method 300 represented in FIG. 3.

As mentioned previously, the negative response may include the digital signage content identifier of the digital signage content 275. This allows the digital signage server 100 to distinguish between concurrently received negative responses corresponding to different digital signage contents 275 to be displayed on the plurality of synchronized players 200.

As mentioned previously, the synchronized player 200 sends a negative response (step 415) if it is not capable of displaying the digital signage content 275, and does not send any response if it is capable of displaying it. Alternatively, the synchronized player 200 sends a negative response (step 415) if it is not capable of displaying the digital signage content 275, and sends a positive response (optional step 420) if it is capable of displaying it. For example, the response comprises a flag indicating the capability or incapability of displaying the digital signage content 275.

Following step 415, step 405 may be performed again and a new synchronization request is received from the digital signage server 100. As mentioned previously, the digital signage server 100 sends up to a maximum number of consecutive synchronization requests, and consequently the synchronized player 200 receives up to the maximum number of consecutive synchronization requests. This procedure has been detailed previously when describing the steps (more specifically step 325) of the method 300 illustrated in FIG. 3. Thus, several iterations of steps 405, 410 and 415 may occur. The maximum number of iterations corresponds to the maximum number of consecutive synchronization requests sent by the digital signage server 100.

For example, when a first synchronization request is received at step 405, it is determined at step 410 that the synchronized player 200 is not capable of displaying the digital signage content 275 and a first negative response is sent at step 415. When a second synchronization request is received at step 405, it is determined at step 410 that the synchronized player 200 is now capable of displaying the digital signage content 275 and the method 400 proceeds to optional step 420 or to step 425. Alternatively, when the second synchronization request is received at step 405, it is determined at step 410 that the synchronized player 200 is still not capable of displaying the digital signage content 275 and a second negative response is sent at step 415. This iterative procedure ends either when it is determined at step 410 that the synchronized player 200 is capable of displaying the digital signage content 275 or when the maximum number of consecutive synchronization requests is reached.

The method 400 comprises the optional step 420 of transmitting the positive response (indicative of the synchronized player 200 being capable of displaying the digital signage content 275) to the digital signage server 100. Step 420 is executed by the processing unit 210 of the synchronized player 200. The positive response is transmitted via the communication interface 230. As mentioned previously, step 420 is executed if the determination at step 410 is positive.

The method 400 comprises the step 425 of receiving a display command from the digital signage server 100, for displaying the digital signage content 275 on the display 260 of the synchronized player 200. Step 425 is executed by the processing unit 210 of the synchronized player 200. The display command is received via the communication interface 230. The display command comprises the digital signage content identifier of the digital signage content 275 to be displayed. Step 425 corresponds to step 335 of the method 300 represented in FIG. 3.

As mentioned previously, the display command may be broadcasted, multicasted or unicasted.

The method 400 comprises the step 430 of displaying the digital signage content 275 on the display 260 of the synchronized player 200. Step 430 is executed by the processing unit 210 of the synchronized player 200. Substantially at the same time, the digital signage content 275 is displayed on the display(s) 260 of the other synchronized player(s) 200 belonging to the same synchronized group, to provide the synchronized display functionality supported by the methods 300 (represented in FIG. 3) and 400.

As mentioned previously, in order to ensure the synchronized display on the plurality of synchronized players 200 belonging to the same synchronized group, the display command may include a time reference (an absolute or a relative time reference). In this case, the display of the digital signage content 275 on the display 260 at step 430 is performed after the execution of step 425 with a timing in accordance with the time reference.

Alternatively, the digital signage content 275 is displayed on the display 260 (step 430) directly after receiving the display command at step 425.

It may also occur that following a determination at step 410 that the synchronized player 200 is capable of displaying the digital signage content 275 (and following optional step 420 if it is executed), step 425 does not occur. More specifically, the synchronized player 200 does not receive a display command from the digital signage server 100. Instead, the synchronized player 200 receives a new synchronization request and step 405 is executed (this corresponds to the sequence of steps 315-320-325-310 of the method 300 represented in FIG. 3). Alternatively, the synchronized player 200 no longer receives any message related to the digital signage content 275 from the digital signage server and the method 400 stops (this corresponds to the sequence of steps 315-320-325-330 of the method 300 represented in FIG. 3). These use cases have not been represented in FIG. 4 for simplification purposes. These use cases occur when at least another synchronized player 200 executing the method 400 is not capable of displaying the digital signage content 275.

The method 300 illustrated in FIG. 3 and the method 400 illustrated in FIG. 4 are not limited to the field of digital signage. These methods apply more generally to the synchronized display of a digital content (e.g. a video, a still image, etc.) on a plurality of computing devices (corresponding to the plurality of synchronized players 200 belonging to the synchronized group) under the control of a server (corresponding to the digital signage server 100).

Figure 5:
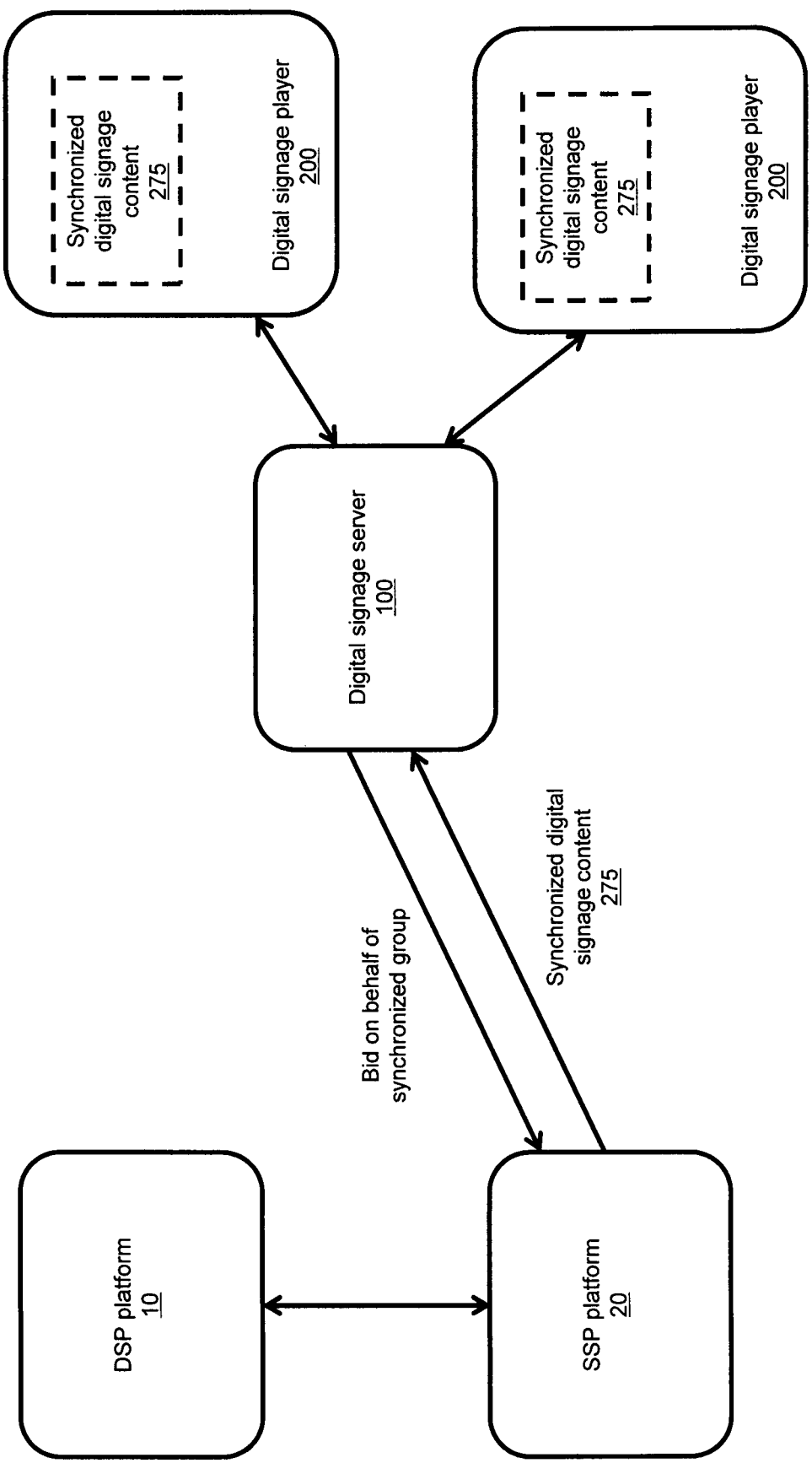
FIG. 5 illustrates an architecture allowing the digital signage server of FIG. 2 to bid for the synchronized digital signage content.

Referring now concurrently to FIGS. 2 and 5, an architecture allowing digital signage server(s) 100 to bid for digital signage content(s) 275 is illustrated. A single digital signage server 100 is represented in FIG. 5, but any number of digital signage servers 100 may be interacting with a supply-side platform (SSP) 20.

The SSP 20 is well known in the art of advertising. It allows publishers to automate the selling of their advertising space or inventory. The SSP 20 is designed to allow the publishers to maximize the price at which they sell their advertising space or inventory. Each digital signage server 100 can be considered as an independent publisher selling advertising space via the SSP 20.

As mentioned previously, each digital signage server 100 controls one or more synchronized group, each group comprising a plurality of synchronized players 200. The grouping is based on a predicted common audience of the plurality of synchronized players 200 belonging to a given synchronized group. The predicted audience is determined based on static audience characteristics of the synchronized players 200 (e.g. location of the players, proximity of the players with respect to one another, expected profile of the viewers, etc.). A synchronized group is constituted of synchronized players 200 having common audience characteristics. The audience characteristics of the synchronized players 200 can also be determined at least partially in real-time, using environmental sensor(s), camera(s) for determining persons coming closer to/moving away from a player, probes for analyzing the Wi-Fi signals of neighboring mobile devices (e.g. smartphones), infrared (IR) beam analyzer(s), turnstile data analyzer(s), etc. The grouping is dynamic and can evolve over time (player(s) can be added or removed from a given synchronized group), following a corresponding evolution of the audience characteristics of the synchronized players 200.

Each synchronized group is characterized by parameters which are common to the plurality of synchronized players 200 belonging to the group. Examples of parameters include the predicted audience of the synchronized group (for example a number of persons in front of the displays 260 of the synchronized players 200), a geometry of the displays 260 of the synchronized players 200, a latitude and longitude of the synchronized players 200, etc. The parameters of the synchronized group are transmitted by the digital signage server 100 to the SSP 20 process, to perform a bidding process for the advertising space available for the synchronized group. During the bidding process, the SSP 20 determines (based on the transmitted parameters) the digital signage content(s) 275 to be displayed simultaneously on the plurality of synchronized players 200 of the synchronized group. The determined digital signage content(s) 275 is downloaded by the plurality of synchronized players 200 before the synchronized display effectively takes place. The digital signage server 100 is in charge of coordinating the delivery of the digital signage content(s) 275 to the synchronized players 200.

The demand-side platform (DSP) 10 represented in FIG. 5 is a counterpart of the SSP 20. It allows advertisers to buy impressions from a plurality of publishers. In FIG. 5, the SSP 20 is the intermediation platform between advertisers represented by the DSP 10 and the digital signage server(s) 100. The DSP 10 has a plurality of digital signage contents to play and the digital signage server(s) 100 have advertising space available for playing the digital signage contents. The SSP 20 selects which digital signage content 275 is adapted to a given synchronized group, based on the parameters of the synchronized group provided by the corresponding digital signage server 100.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for synchronizing display of a digital content on a plurality of computing devices, the method comprising:
    storing by a processing unit of a server in a memory of the server a plurality of digital content identifiers identifying a corresponding plurality of digital contents;
    determining by the processing unit of the server based on one or more criterion a given digital content among the plurality of digital contents to be displayed synchronously on respective displays of the plurality of computing devices, the given digital content being identified by a corresponding given digital content identifier among the plurality of digital content identifiers;
    transmitting by the processing unit of the server a synchronization request to the plurality of computing devices, the synchronization request comprising the given digital content identifier;
    determining by the processing unit of the server a number of negative responses received from the plurality of computing devices in response to the synchronization request, each negative response being indicative of one among the plurality of computing devices not being capable of displaying the given digital content, the number of negative responses received being an integer comprised between 0 and N where N is the number of computing devices; and
    if the number of negative responses received reaches a threshold, transmitting by the processing unit of the server a new synchronization request to the plurality of computing devices, the new synchronization request comprising the given digital content identifier.

2. The method of claim 1, wherein the server consists of a digital signage server, the plurality of computing devices consists of a plurality of digital signage players, and the plurality of digital contents consists of a plurality of digital signage contents.

3. The method of claim 1, wherein the threshold is one negative response.

4. The method of claim 1, wherein the processing unit of the server waits for a pre-defined amount of time before transmitting the new synchronization request.

5. The method of claim 1, wherein if the number of negative responses received does not reach the threshold, the processing unit of the server transmits a display command to the plurality of computing devices for displaying the given digital content on the respective displays of the plurality of computing devices, the display command comprising the given digital content identifier.

6. The method of claim 1, wherein if a timer reaches a timeout value, the processing unit of the server transmits a display command to the plurality of computing devices for displaying the given digital content on the respective displays of the plurality of computing devices, the display command comprising the given digital content identifier.

7. The method of claim 1, wherein the synchronization request is broadcasted.

8. The method of claim 1, wherein the synchronization request further comprises at least one of the following: instructions to download the given digital content, conditions to clear or reset display of the given digital content, and instructions to ready the given digital content for display.

9. A non-transitory computer program product comprising instructions executable by a processing unit of a server, the execution of the instructions by the processing unit of the server providing for synchronizing display of a digital content on a plurality of computing devices by:
    storing by a processing unit of the server in a memory of the server a plurality of digital content identifiers identifying a corresponding plurality of digital contents;
    determining by the processing unit of the server based on one or more criterion a given digital content among the plurality of digital contents to be displayed synchronously on respective displays of the plurality of computing devices, the given digital content being identified by a corresponding given digital content identifier among the plurality of digital content identifiers;
    transmitting by the processing unit of the server a synchronization request to the plurality of computing devices, the synchronization request comprising the given digital content identifier;
    determining by the processing unit of the server a number of negative responses received from the plurality of computing devices in response to the synchronization request, each negative response being indicative of one among the plurality of computing devices not being capable of displaying the given digital content, the number of negative responses received being an integer comprised between 0 and N where N is the number of computing devices; and
    if the number of negative responses received reaches a threshold, transmitting by the processing unit of the server a new synchronization request to the plurality of computing devices, the new synchronization request comprising the given digital content identifier.

10. The computer program product of claim 9, wherein the server consists of a digital signage server, the plurality of computing devices consists of a plurality of digital signage players, and the plurality of digital contents consists of a plurality of digital signage contents.

11. The computer program product of claim 9, wherein the threshold is one negative response.

12. The computer program product of claim 9, wherein the processing unit of the server waits for a pre-defined amount of time before transmitting the new synchronization request.

13. The computer program product of claim 9, wherein if the number of negative responses received does not reach the threshold, the processing unit of the server transmits a display command to the plurality of computing devices for displaying the given digital content on the respective displays of the plurality of computing devices, the display command comprising the given digital content identifier.

14. The computer program product of claim 9, wherein the synchronization request is broadcasted.

15. A server adapted for synchronizing display of a digital content on a plurality of computing devices, the server comprising:
- memory for storing a plurality of digital content identifiers identifying a corresponding plurality of digital contents;
- a communication interface for exchanging data with the plurality of computing devices; and
- a processing unit for:
  - determining based on one or more criterion a given digital content among the plurality of digital contents to be displayed synchronously on respective displays of the plurality of computing devices, the given digital content being identified by a corresponding given digital content identifier among the plurality of digital content identifiers;
  - transmitting a synchronization request to the plurality of computing devices via the communication interface, the synchronization request comprising the given digital content identifier;
  - determining a number of negative responses received from the plurality of computing devices in response to the synchronization request via the communication interface, each negative response being indicative of one among the plurality of computing devices not being capable of displaying the given digital content, the number of negative responses received being an integer comprised between 0 and N where N is the number of computing devices; and
  - if the number of negative responses received reaches a threshold, transmitting a new synchronization request to the plurality of computing devices via the communication interface, the new synchronization request comprising the given digital content identifier.

16. The server of claim 15, wherein the server consists of a digital signage server, the plurality of computing devices consists of a plurality of digital signage players, and the plurality of digital contents consists of a plurality of digital signage contents.

17. The server of claim 15, wherein the threshold is one negative response.

18. The server of claim 15, wherein the processing unit waits for a pre-defined amount of time before transmitting the new synchronization request.

19. The server of claim 15, wherein if the number of negative responses received does not reach the threshold, the processing unit transmits a display command to the plurality of computing devices for displaying the given digital content on the respective displays of the plurality of computing devices, the display command comprising the given digital content identifier.

20. The server of claim 15, wherein the synchronization request is broadcasted.

21. The method of claim 1, wherein the one or more criterion comprises a display loop defining a sequence of digital contents to be displayed over time, and current audience characteristics of the plurality of computing devices.

22. The computer program product of claim 9, wherein the one or more criterion comprises a display loop defining a sequence of digital contents to be displayed over time, and current audience characteristics of the plurality of computing devices.

23. The computer program product of claim 9, wherein if a timer reaches a timeout value, the processing unit of the server transmits a display command to the plurality of computing devices for displaying the given digital content on the respective displays of the plurality of computing devices, the display command comprising the given digital content identifier.

24. The server of claim 15, wherein the one or more criterion comprises a display loop defining a sequence of digital contents to be displayed over time, and current audience characteristics of the plurality of computing devices.

25. The server of claim 15, wherein if a timer reaches a timeout value, the processing unit of the server transmits a display command to the plurality of computing devices for displaying the given digital content on the respective displays of the plurality of computing devices, the display command comprising the given digital content identifier.

* * * * *